A. McK. WATERS.
AGRICULTURAL IMPLEMENT.
APPLICATION FILED APR. 14, 1915.
1,197,086.
Patented Sept. 5, 1916.
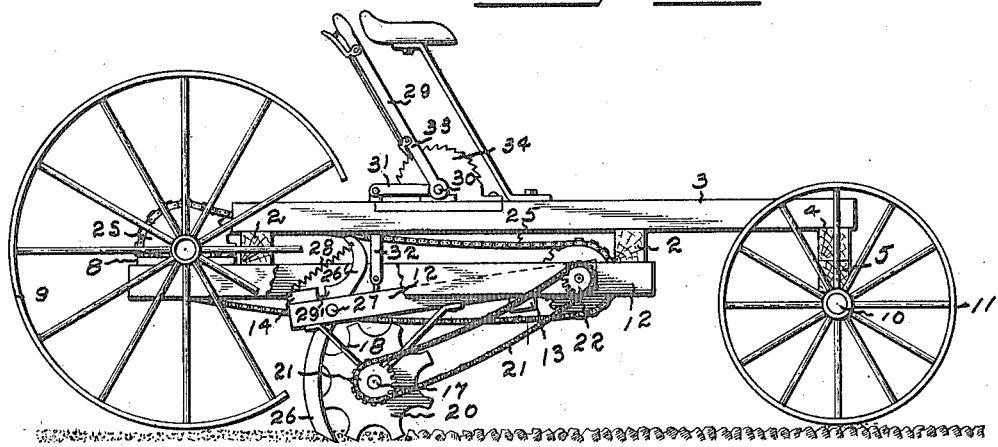
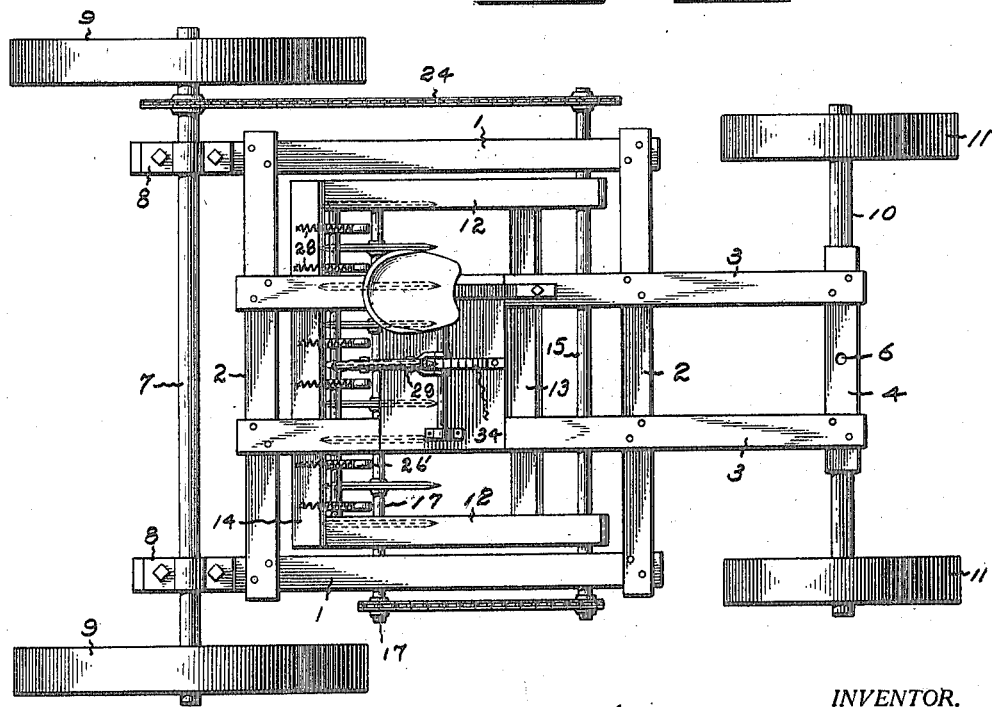
WITNESSES:
INVENTOR.
BY
ATTORNEY

UNITED STATES PATENT OFFICE.

ANDREW McK. WATERS, OF SAN FRANCISCO, CALIFORNIA.

AGRICULTURAL IMPLEMENT.

1,197,086.  Specification of Letters Patent.  Patented Sept. 5, 1916.

Application filed April 14, 1915. Serial No. 21,240.

*To all whom it may concern:*

Be it known that I, ANDREW McK. WATERS, a subject of the Kingdom of Great Britain, and at present residing in the city and county of San Francisco, State of California, (whose post-office address is 402 New Call Building,) have invented new and useful Improvements in Agricultural Implements, of which the following is a specification.

This invention relates more particularly to machines for pulverizing or mulshing plowed ground.

Among the objects of this invention are to be provided:—a machine that will break up and pulverize clods; that is simple and economical to construct and operate; that will leave the surface of the ground level; that is positive in its operation; that may be adjusted to pulverize the soil to a desired depth.

Other objects and advantages will appear as the description progresses.

In the drawings accompanying and forming part of the present specification, to which like reference characters have been applied, a simple form of putting this invention into practice is shown. I do not wish to be understood as confining this invention to the disclosures made in said drawing and description, as many variations may be introduced, within the spirit of this invention, as defined in the claim succeeding the said description.

The operations of plowing is often pursued at the time the surface of the ground is dry and has a tendency to form clods when broken by the plow. It is the nature of certain soil to form clods at the time of plowing, which clods later on dry and form hard lumps that resist the operation of such pulverizing implements as harrows, drags and the like. Leaving the surface of the ground strewn with clods has a very deleterious effect on the fertilizing and moisture retaining qualities of the soil, the clods exposing a greater surface to evaporation than if the surface of the soil was covered with a pulverized mulsh, presenting the minimum area to evaporation, resulting in a conservation of moisture, a condition greatly to be desired, particularly in dry farming districts where the rainfall is comparatively light and the soil must be worked while containing less moisture than in districts where conservation of moisture is of less importance.

In the accompanying one sheet of drawings: Figure 1 is a side elevation of a pulverizing machine constructed in accordance with this invention; a section of the main frame being broken away better to disclose the underlying structure. Fig. 2 is a plan view from above of the same.

These drawings are diagrammatic and simply indicate a simple embodiment of this invention susceptible of many variations to fit special conditions, as to constructive materials and varying conditions of operation.

In detail the construction illustrated in the drawings includes the main frame, composed of the side beams 1 joined by the cross beams 2—2, forming a rectangular frame having the superimposed longitudinal beams 3—3 secured to the cross beams 2—2 and extending forward to the cross bolster 4, resting upon the axle tree 5 swiveled on the king bolt 6. The main axle 7 is journaled in the bearings 8—8 attached to the rearward extensions of the side beams 1—1. The traction wheels 9—9 are fixed on the rear axle 8 and support the rear end of the main frame. One of the rear wheels may be revoluble on the axle to facilitate turning corners. The pulverizing elements consist of a transverse disk shaft 17 that is journaled in the brackets 18, extending downward beneath the side beams 12 to which they are fixed.

The rotary cutting disks 20 are fixed on the shaft 17 spaced apart the required distance. These disks 20 preferably consist of thin circular blank of sheet steel with the edges cut away as illustrated in Fig. 1, to produce a chopping effect when the disks are rotated in contact with the clods to be pulverized. The shaft 17 is rotated by the sprocket chain 21 engaging the sprocket 22 fixed on the counter shaft 15. The counter shaft 15 is rotated by a sprocket fixed on its end driven by the sprocket chain 24 engaging the sprocket 25 fixed on the revolving axle 7. The rotation of the traction wheel 9 is communicated through the sprocket transmission gearing described, to the shaft 17 that is rotated at a higher speed than the traction wheels 9, from which it derives its power.

The spring teeth 26 are pivoted on the transverse shaft 27 extending between the side beams 12, the teeth extending downward between the disks 20, acting as a rake for accumulating clods within the breaking area of the disks 20. The upper extensions 26' of these teeth are provided with the springs 28 having their opposite ends attached to the cross bars 14. The springs 28 permit the teeth 26 to swing backward to clear stumps, embedded rocks or other obstructions that they cannot dislodge and that might break the teeth or other part of the mechanism. When one or more of the teeth 26 strike such an obstruction the springs 28 expand permitting the teeth 26 to spring backward and upward to clear the obstruction. The teeth are provided with the shoulder 29' abutting the edge of the cross beams 14 to hold the teeth in proper vertical alinement. The shoulder 29' also serves to reinforce the teeth 26 adjacent the point of greatest strain.

The clods accumulated in front of the teeth 26 are chopped into pieces small enough to pass between the disks and the adjacent teeth. It is evident that the disks can be spaced apart on the shaft 17 and the intermediate teeth 26 on the shaft 27, in accordance with the size it is desired to reduce the clods to. In very cloddy ground it is preferable to have a number of implements constructed in accordance with this invention sent around the field with the coarse pulverizer at the head, followed by successive implements in which the disks and teeth are set closer together, until the desired pulverizing is accomplished by the successive operations. It is also evident that seeders and other forms of planters may be mounted upon this implement, the seeds being planted in the furrows created by the teeth 26 and covered by the resultant mulsh by suitable harrows or rollers attached to or following the pulverizer.

The swinging frame in which the disks are mounted may be raised and lowered by the lever 29 pivoted at 30 and provided with the extension crank 31 connected to the side beams 12 by the links 32 pivoted thereto. The swinging frame being raised and lowered by swinging the lever 29 on its center 30 and locking the frame at the desired height by means of the latch 33 engaging the notched edge of the quadrant 34. During transportation the lever 29 is thrown forward until the disks and teeth 26 clear the ground; the swinging frame being elevated to a position beneath the beams 3.

Having thus described this invention what I claim and desire to secure by Letters Patent is: —

A pulverizer having a swing frame, a transverse pivot rod carried by said frame, rake teeth pivoted intermediate their ends on said rod, a cross bar at the rear of said teeth and extending above the pivotal point thereof, spring means attached to the upper end of said teeth and to the cross bar to swing the upper end of said teeth toward the cross bar, and shoulders formed on the teeth above their pivotal points for engagement with said cross bar, at which time the teeth are in proper vertical alinement.

In testimony whereof, I have hereunto set my hand this 13th day of March, 1915.

ANDREW McK. WATERS.

Witnesses:
 BALDWIN VALE,
 WM. B. STARR.